United States Patent
Koyama

(10) Patent No.: US 6,371,647 B1
(45) Date of Patent: Apr. 16, 2002

(54) GUIDE MECHANISM

(75) Inventor: Hideho Koyama, Ryugasaki (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/646,883

(22) PCT Filed: Apr. 7, 1999

(86) PCT No.: PCT/JP99/01848

§ 371 Date: Oct. 6, 2000

§ 102(e) Date: Oct. 6, 2000

(87) PCT Pub. No.: WO99/53204

PCT Pub. Date: Oct. 21, 1999

(30) Foreign Application Priority Data

Apr. 8, 1998 (JP) .......................................... 10-096470

(51) Int. Cl.[7] .............................................. F16C 29/02
(52) U.S. Cl. .......................................... 384/37; 384/42
(58) Field of Search ............................. 384/37, 42, 41, 384/10, 26

(56) References Cited

U.S. PATENT DOCUMENTS 4,890,937 A * 1/1990 Balsells ....................... 277/589

* cited by examiner

Primary Examiner—Lenard A. Footland
(74) Attorney, Agent, or Firm—Paul A. Guss

(57) ABSTRACT

When a guide block 20 is located on each of both ends of a guide rail 18, rollers 50 are situated at a position where they are supported by hard supporting members 28a and 28b of a rail member 36, so that the guide block 20 is positioned at a predetermined position precisely. On the other hand, when the guide block 20 is located at a position in the vicinity of a center of the guide rail 18, the rail member 36 is slightly bent by elasticity of an elastic supporting member 32 in spite of lowering of a position precision in the vicinity of the guide rail 18 due to a warp, a distortion, a bend and the like. Thus, an overload applied to the foregoing rail member 36 and the like is relieved.

7 Claims, 11 Drawing Sheets

GUIDE MECHANISM

TECHNICAL FIELD

The present invention relates to a guide mechanism for guiding one member making a relative displacement to the other member.

BACKGROUND ART

In an apparatus such as a rodless cylinder, in which one member makes a relative displacement to the other member, a guide mechanism for guiding one member relative to the other member has been hitherto used widely. The guide mechanism in the conventional technology is constructed such that a guide block constituting a guide mechanism is fixed to a displacement member making a displacement by means of a rodless cylinder or the like, and the guide block makes a displacement slidably along a guide rail formed to be elongate.

However, in the foregoing conventional guide mechanism, even when the guide block is structured so as to be stopped at a predetermined position of the guide rail and a positioning precision of the guide block is improved by fitting the predetermined portion of the guide rail to a base and the like with a high position precision, a tensile action, a compression action and the like occur between the guide block and the guide rail due to a warp, a distortion, a bend and the like caused in the guide rail, during a slide of the guide block on other portions except for the predetermined portion. As a result, a guide function of the guide mechanism may be damaged owing to wear of the guide rail or an application of an overload to a roller provided in the guide block. As a displacement amount is made to be larger accompanied with lengthening of the guide rail, the possibility of the damage of the guide function becomes higher.

A general object of the present invention is to provide a guide mechanism capable of smoothly exerting a guide function by absorbing an overload applied to a guide block and a guide rail even when a warp, a distortion, a bend and the like occur in the guide rail.

A principal object of the present invention is to provide a guide mechanism capable of improving durability of a guide block and a guide rail by suitably absorbing an overload applied to the guide block and the guide rail.

DISCLOSURE OF THE INVENTION

According to the present invention, when a position precision of other portions except for a predetermined portion of a guide rail is deteriorated, though during a slide of a guide block on the other portions, a rail member is pressed by a tensile action, a compression action and the like functioning between the guide rail and the guide block, the rail member makes a displacement by an elastic action of an elastic supporting member. Accordingly, application of a large force to the guide block and the guide rail can be prevented, and a guide function can be exerted smoothly.

BEST MODE FOR CARRYING OUT THE INVENTION

Preferred embodiments of a guide mechanism according to the present invention will be described in detail with reference to the accompanying drawings below.

Figure 1:
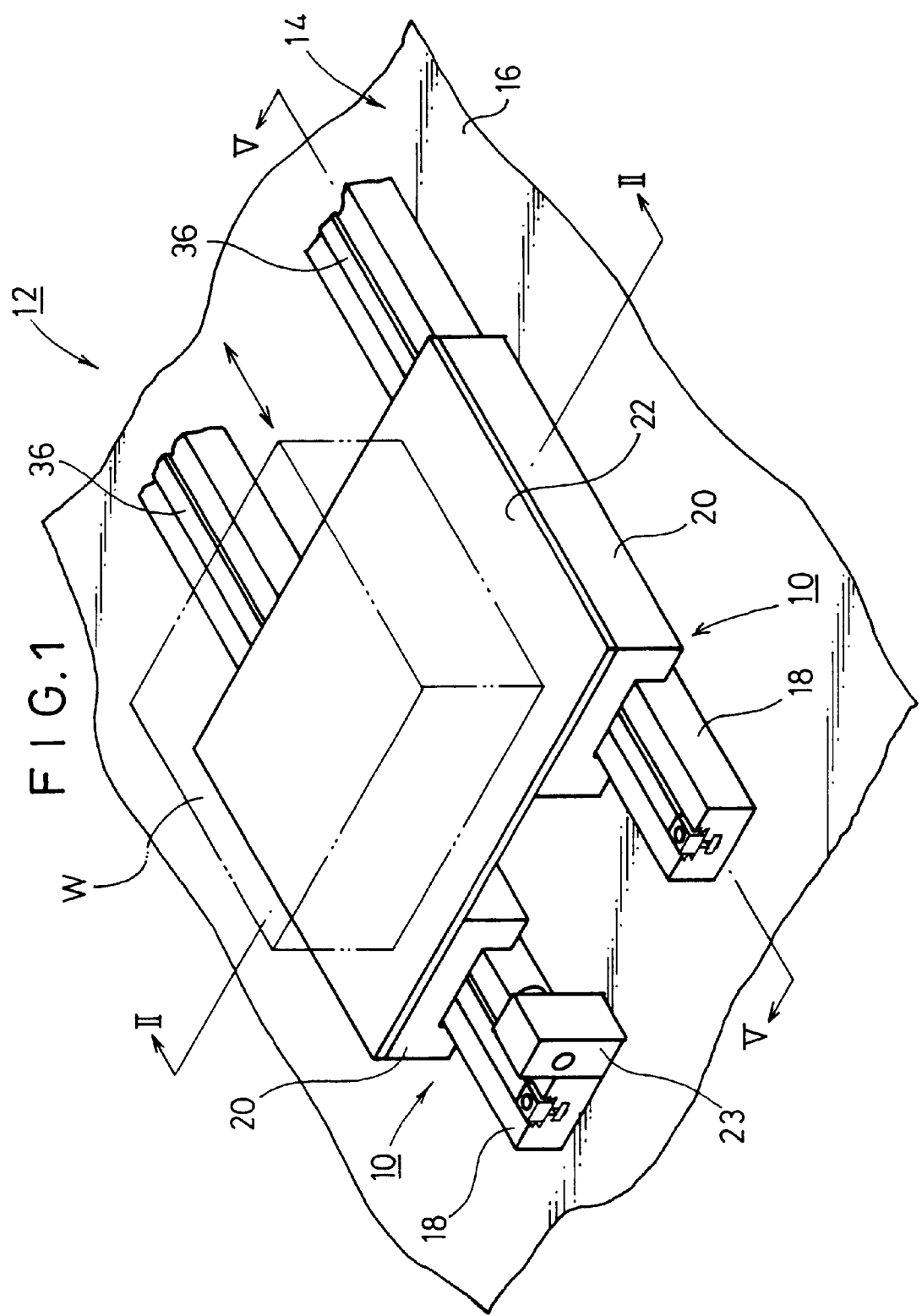
FIG. 1 is a perspective view of a displacement apparatus to which a guide mechanism according to a first embodiment of the present invention is applied.
Figure 2:
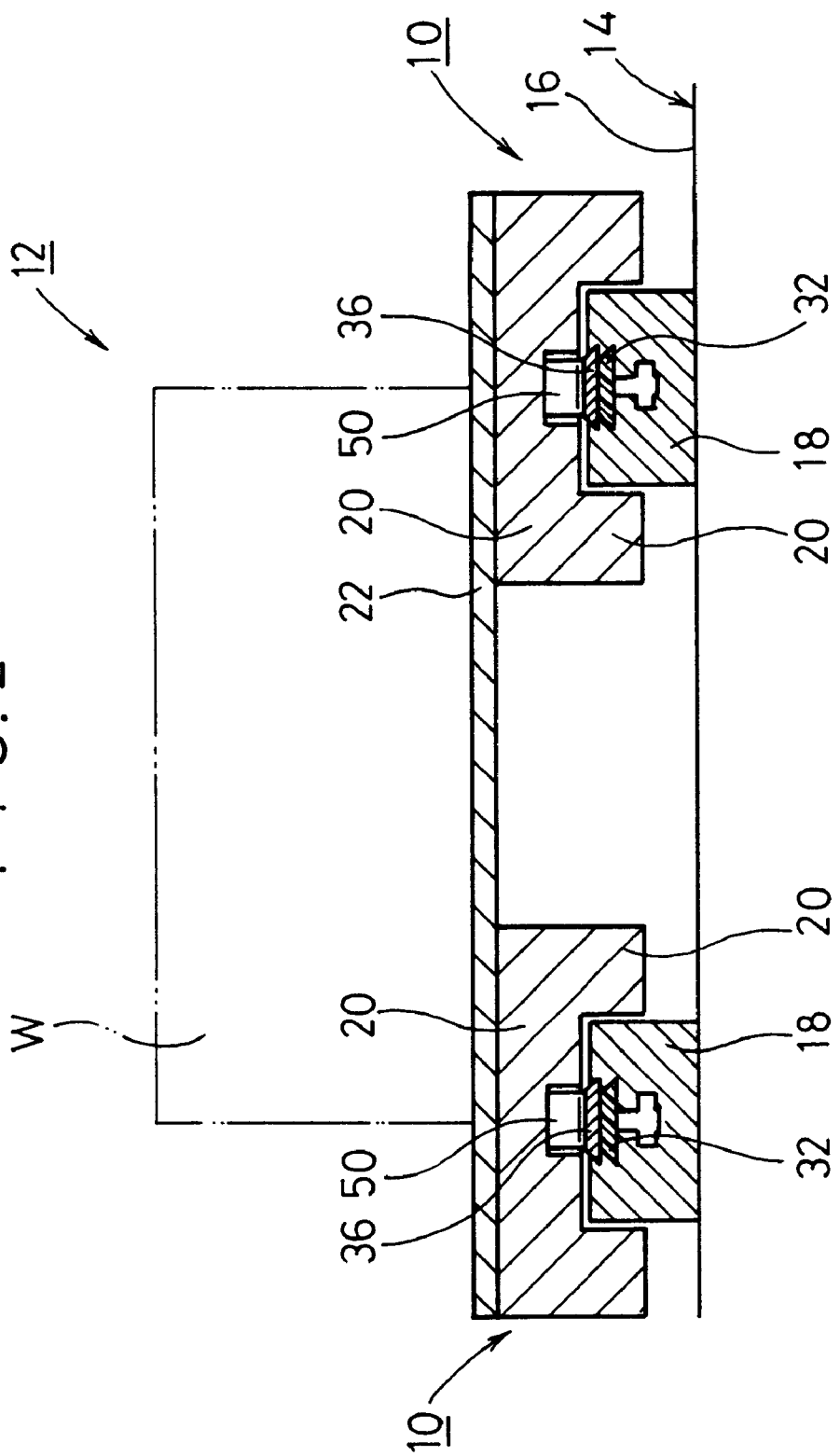
FIG. 2 is a vertically sectional view taken along the line II—II of FIG. 1.

In FIGS. 1 and 2, a displacement apparatus 12 is illustrated to which a guide mechanism 10 according to a first embodiment of the present invention is applied. The displacement apparatus 12 comprises two guide mechanisms 10, 10 fixed to a fitting plane 16 of a base 14 which are approximately in parallel with each other. Each guide mechanism 10 has an elongate guide rail 18 and a guide block 20 which engages with the guide rail 18 slidably.

A plate-shaped table 22 is mounted in a fixed condition on upper surfaces of, a pair of guide blocks 20 and 20, each of which is apart from the other with a predetermined distance. A stopper 23 is fixed to the base 14, and the guide block 20 abuts against the stopper 23, so that the table 22 stops its movement to be positioned. Note that the two guide mechanisms 10, 10 have approximately an identical structure and the same components are explained below using the same reference numerals.

Figure 3:
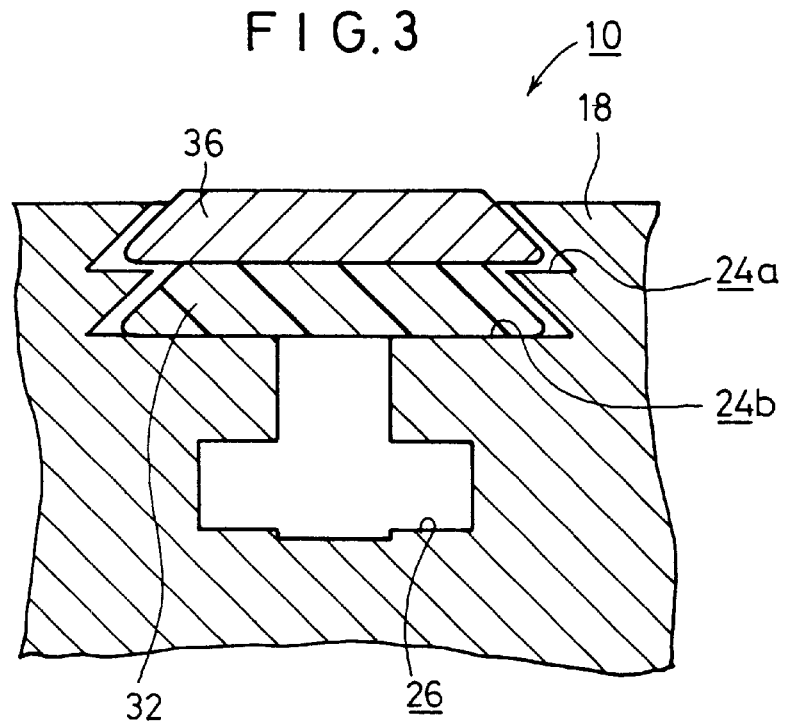
FIG. 3 is a partially enlarged, vertically sectional view of a hard supporting member and an elastic supporting member, which constitute the guide mechanism.
Figure 4:
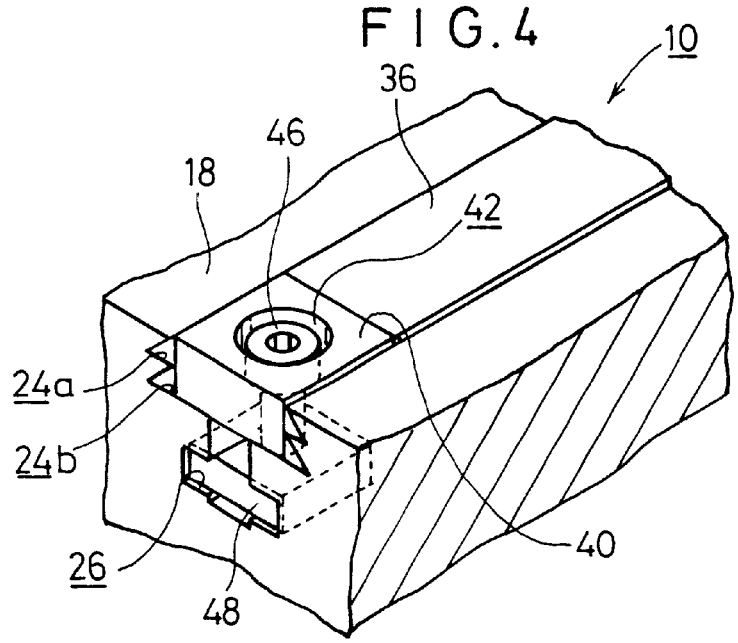
FIG. 4 is a partially cutaway enlarged perspective view of an latching member constituting the guide mechanism.

In an upper surface of the guide rail 18, groove portions 24a and 24b having almost trapezoidal shapes in section are formed along their longitudinal directions so as to be superposed upon the other as shown in FIGS. 3 and 4. A groove portion 26 having an almost T-shaped cross section is formed in the bottom of the groove portion 24b.

Figure 5:
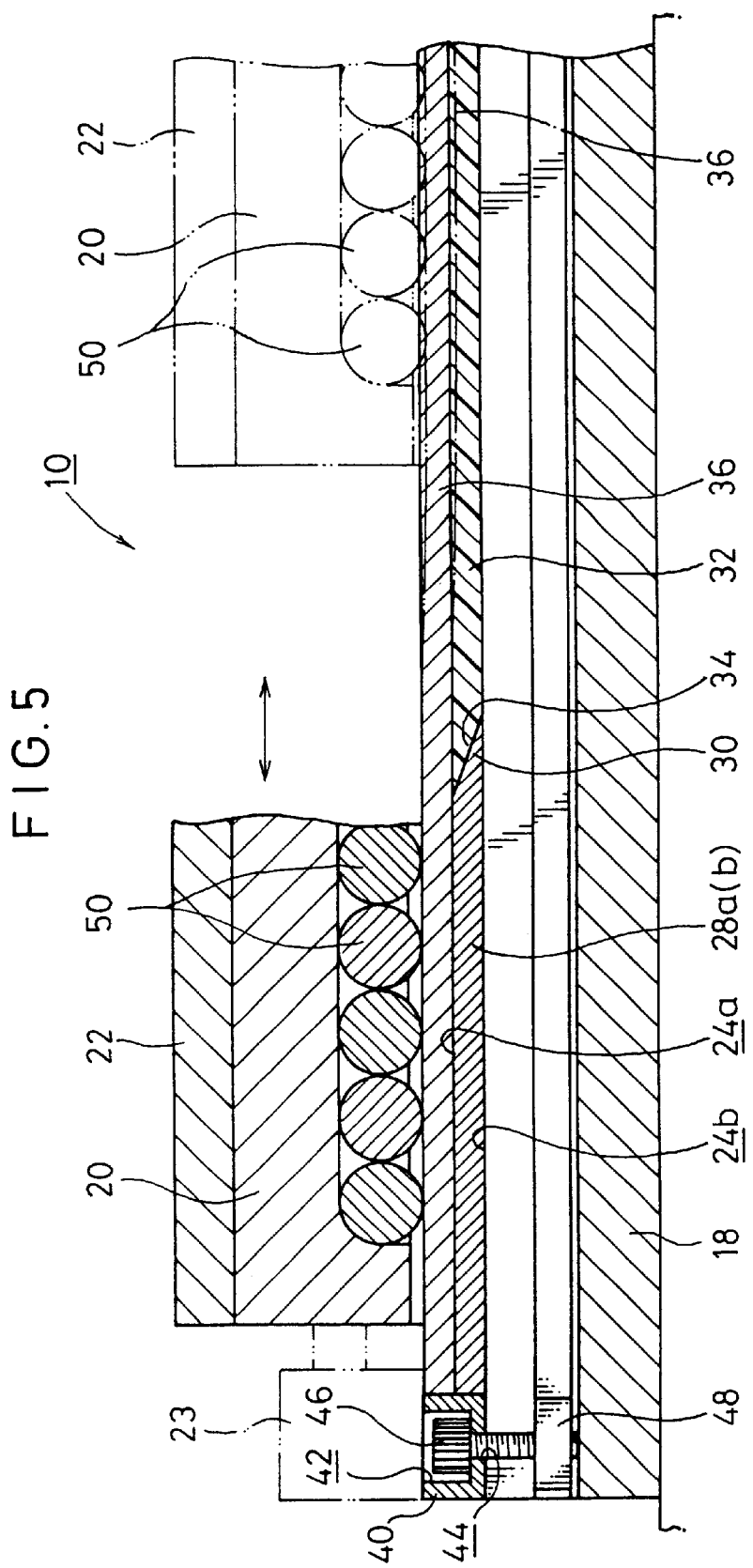
FIG. 5 is a vertically sectional view taken along the line V—V of FIG. 1.

In both ends of the groove portion 24b in the axis line direction of the guide rail 18, a pair of hard supporting members 28a and 28b formed to be approximately trapezoidal in section, which are formed of a metal material such as steel, are inserted as shown in FIG. 5. A first tapered portion 30 which gradually reduces its thickness toward the center of the guide rail 18 is formed in each of the hard supporting members 28a and 28b. An elastic 20 supporting member 32 formed of a high polymer material such as rubber containing elastomer or a member having elasticity such as a sponge is inserted between the hard supporting members 28a and 28b, which are inserted in the groove portion 24b. A second tapered portion 34 is formed at both ends of the elastic supporting member 32 such that its thickness gradually reduces, thereby being engaged with the first tapered portion 30 of each of hard supporting members 28a and 28b. A rail member 36 formed of a metal material such as steel and having an almost trapezoidal section is inserted in the groove portion 24a. Thus, the rail member 36 is supported by the hard supporting members 28a and 28b in its both ends in its axis line direction, and supported by the elastic supporting member 32 in the vicinity of the center thereof. Accordingly, although both ends of the rail member 36 have no flexibility, the center portion of the rail member 36 is formed so as to be slightly flexible due to elasticity of the elastic supporting member 32.

A latching member 40 is engaged with each of both ends of the groove portions 24a and 24b in the axis line direction of the guide rail 18 as shown in FIGS. 4 and 5. A concave portion 42 is formed in the center of the latching member 40, and a hole portion 44 communicates with the bottom defining the concave portion 42. A screw 46 screws through the hole portion 44, and the screw 46 is securely fastened to a nut member 48 in an almost rectangular shape which is inserted in the groove portion 26. As a result, the latching member 40 is latched to each of the grooves 24a and 24b. In this case, the latching member 40 serves to position the hard supporting members 28a and 28b and the rail member 36 and to prevent falling out of them.

As shown in FIG. 5, a plurality of rollers 50 capable of rolling on the rail member 36 are provided in the guide block 20. Accordingly, the guide block 20 can make a displacement relative to the guide rail 18 with a resistance as small as possible thereto.

The guide mechanism 10 according to the first embodiment is fundamentally constructed in the above-described manner, and an operation of the guide mechanism 10 and effects thereof will be described below.

A workpiece W is mounted on the table 22. When the guide block 20 abuts against the stopper 23 and the table 22 is situated on one end of the guide mechanism 10 as represented by solid lines in FIG. 5, the rollers 50 provided in the guide block 20 are placed at a position where they are supported by the rail member 36 and the hard supporting member 28a. For this reason, the guide block 20 never makes a displacement in the direction approximately perpendicular to its displacement direction (vertical direction), and hence the table 22 is positioned precisely at a predetermined position.

When the table 22 makes a displacement from one end of the guide rail 18 to the other end thereof either by hand or by a driving operation of a drive power source (not shown), the rollers 50 of the guide block 20 roll on the upper surface of the rail member 36, and the guide block 20 makes a displacement along the guide rail 18. Accordingly, as represented by chain double-dashed lines in FIG. 5, the rollers 50 provided in the guide block 20 are at a position where they are supported by the rail member 36 and the elastic supporting member 32.

In such a situation, when a warp, a distortion, a bend and the like occur in the guide rail 18, a position precision near the center of the guide rail 18 deteriorates, so that a tensile action, a compression action and the like occur between the guide block 20 and the guide rail 18. These tensile action, compression action and the like result in wearing the rail member 36 or applying an overload to the rollers 50. If the load applied to the rollers 50 is further applied to the rail member 36, the rail member 36 slightly bends owing to elasticity of the elastic supporting member 32 (see chain double-dashed lines in FIG. 5). Accordingly, even when the overload is applied to the rollers 50 and the rail member 36, the overload is absorbed by the elasticity of the elastic supporting member 32 appropriately. Thus, the load applied to the rollers 50 is relieved and the rail member 36 is less worn.

Even if the displacement amount of the guide block 20 increases accompanied with lengthening of the guide rail 18, the overload applied to the rollers 50 and the rail member 36 is appropriately absorbed by the elastic supporting member 32, and hence the guide mechanism 10 can exert the guide function smoothly.

When the table 22 makes a further displacement and reaches the other end of the guide mechanism 10, the rollers 50 reach again the position where they are supported by the rail member 36 and the hard supporting member 28b. Therefore, the guide block 20 never makes a displacement in the direction approximately perpendicular to its displacement direction (vertical direction), and hence the table 22 is positioned at a predetermined position precisely.

Furthermore, when the table 22 makes a displacement and hence the rollers 50 make a displacement from the position where they are supported by one of the hard supporting members 28a and 28b of the rail member 36 to the position where they are supported by the elastic supporting member 32, the rail member 36 gradually bends. For the hard supporting members 28a and 28b and the elastic supporting member 32 engage with each other by the first and second tapered portions 30 and 34. Thus no vibrations due to a step difference are generated.

In the first embodiment, the hard supporting members 28a and 28b are provided on both ends of the guide rail 18 and hence a position precision higher than that in the vicinity of the center of the guide rail 18, where the elastic supporting member 32 is provided, can be obtained in both ends of the guide rail 18. However, the present invention is not limited to this structure. As a matter of course, for example, the hard supporting member 28a (28b) may be disposed in a desired portion of the guide rail 18 where a high position precision is required, and the elastic supporting member 32 is disposed in a portion except for the above-mentioned portion.

In the first embodiment, though the rollers 50 are attached to the guide block 20, a sliding member (not shown) abutting against the rail member 36 slidably may be attached to the guide block 20 instead of the rollers 50.

Furthermore, though the pair of guide mechanisms 10, 10 are arranged so as to be approximately parallel with each other in the first embodiment, the present invention is not limited to this arrangement. A single guide mechanism 10 may be used, or two or more guide mechanisms 10 may be juxtaposed.

Next, a guide mechanism according to a second embodiment will be described with reference to FIG. 6 below. Note that the same components as those in the first embodiment are denoted by the same reference numerals and detailed descriptions for them are omitted.

Figure 6:
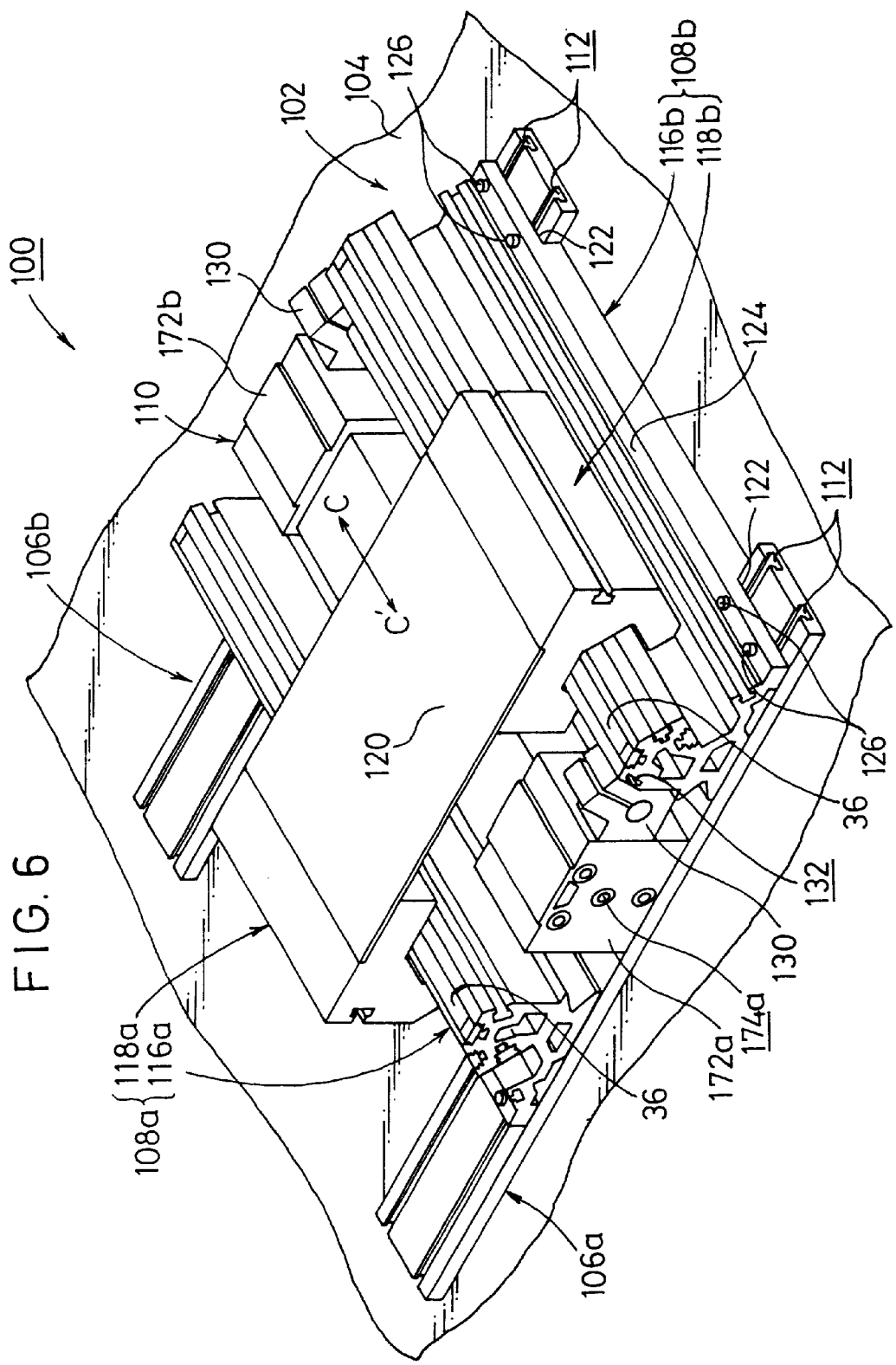
FIG. 6 is a perspective view of a cylinder unit to which a guide mechanism according to a second embodiment of the present invention is applied.

Referring to FIG. 6, reference numeral 100 denotes a cylinder unit to which guide mechanisms 108a and 108b are applied according to the second embodiment of the present invention. The cylinder unit 100 basically comprises: plate-shaped fitting members 106a and 106b fixed to a fitting plane 104 of a base 102 to which the cylinder unit 100 is attached; the guide mechanisms 108a and 108b bridging between the fitting members 106a and 106b so as to stride across them; and a rodless cylinder 110 disposed in the direction approximately perpendicular to the fitting members 106a and 106b.

Figure 7:
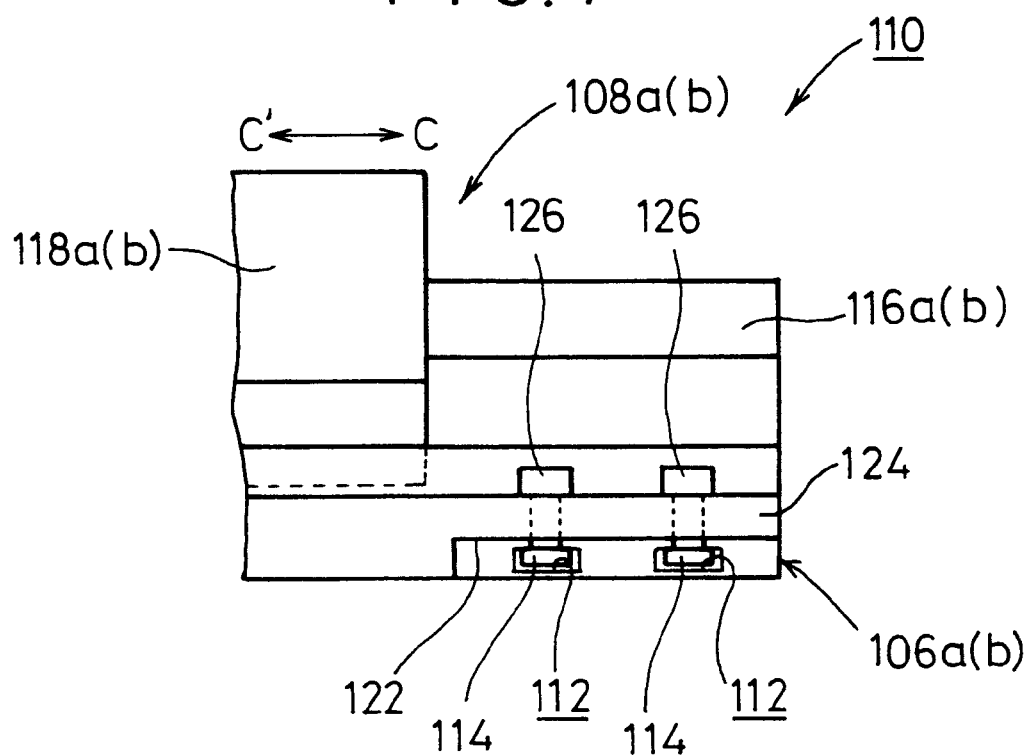
FIG. 7 is a partially enlarged side view of a fitting member constituting the cylinder unit.

In each of the fitting members 106a and 106b, two groove portions 112 are provided extending approximately parallel to the longitudinal direction of each of the fitting members 106a and 106b with an approximately T-shaped section, and a nut member 114 is displaceably inserted in each of the groove portions 112 as shown in FIG. 7.

The guide mechanisms 108a and 108b have guide rails 116a and 116b bridging between the fitting members 106a and 106b in the direction approximately perpendicular thereto, and guide blocks 118a and 118b engaging slidably with the guide rails 116a and 116b, respectively. A plate-shaped table 120 is bridging between the guide blocks 118a and 118b. A gain portion 122 is formed in an end of each of the guide rails 116a and 116b, and the fitting members 106a and 106b engage with the corresponding gain portions 122. The guide rails 116a and 116b are respectively fitted to the fitting members 106a and 106b in the direction approximately perpendicular to the extending direction of the fitting members 106a and 106b.

As shown in FIG. 7, a thinned portion 124 is formed in an edge of each of the guide rails 116a and 116b in the longitudinal direction thereof, and a plurality of screws 126 are screwed through the thinned portion 124. Each screw 126 is fastened securely to the nut member 114. Accordingly, the guide rails 116a and 116b are fixed to the fitting members 106a and 106b, respectively. Moreover, the guide rails 116a and 116b are provided so that they can move along the groove portions of the fitting members 106a and 106b by loosening the screws 126. In the guide rails 116a and 116b, groove portions 128a and 128b, each of which is capable of fitting a position detection sensor (not shown) such as a magnetic sensor thereto and groove portions 132 to which stoppers 130 are attached are formed, respectively (see FIGS. 8 and 9).

Figure 9:
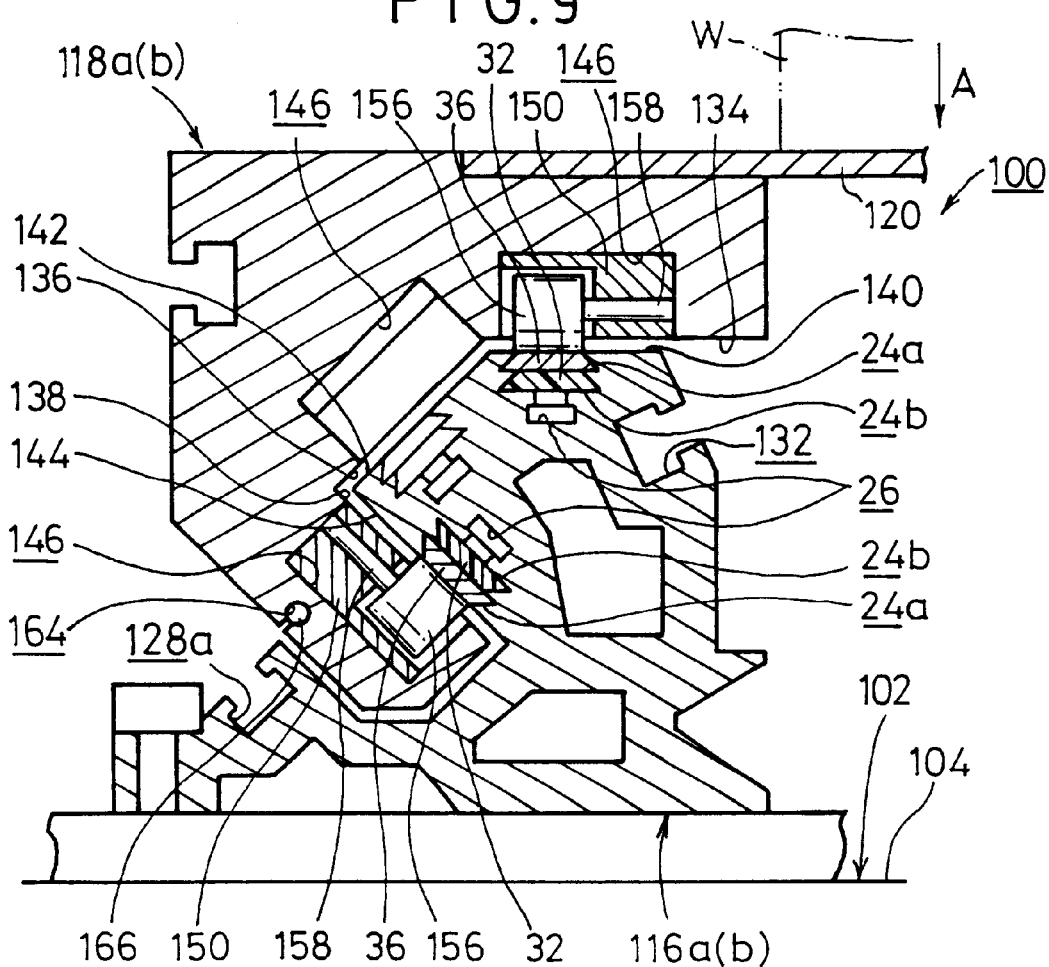
FIG. 9 is a partially enlarged sectional view of the cylinder unit.

As shown in FIG. 9, in each of the guide blocks 118a and 118b, formed are a first parallel plane 134 parallel to the fitting plane 104 of the base 102 to which the cylinder unit 100 is fitted, and a first slant plane 138 tilted clockwise by about 450 relative to the first parallel plane 134. A second slant plane 136 is formed between the first parallel plane 134 and the first slant plane 138, which is tilted counterclockwise by about 45° relative to the first parallel plane 134 and apart by about 90° relative to the first slant plane 138.

The first parallel plane 134, the first slant plane 138 and the second slant plane 136, which are formed in each of the guide blocks 118a and 118b, are provided such that they face a second parallel plane 140, a third slant plane 144 and a fourth slant plane 142, which are formed in each of the guide rails 116a and 116b, respectively.

Figure 10:
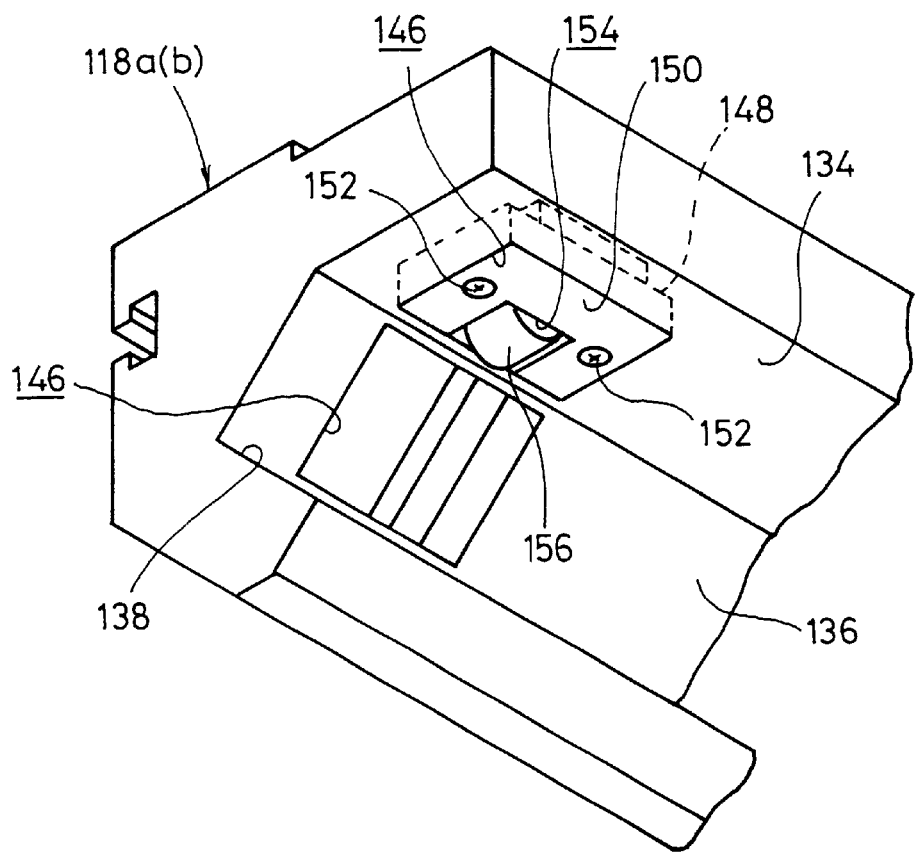
FIG. 10 is a partially enlarged perspective view of a guide block constituting the cylinder unit.
Figure 11:
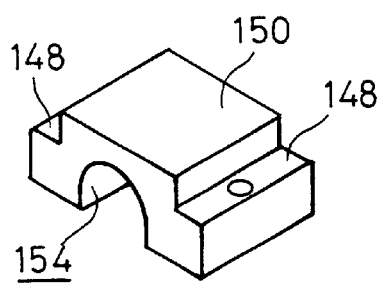
FIG. 11 is a perspective view of a holding member constituting the cylinder unit.

A concave portion 146 is formed in each of the first parallel plane 134, the first slant plane 138 and the second slant plane 136. A holding member 150, in which a step portion 148 is formed, is provided such that it is fitted in the concave portion 146, as shown in FIGS. 10 and 11. The holding member 150 is fastened securely to each of the guide blocks 118a and 118b by a screw 152. FIG. 9 shows the conditions that the holding member 150 is fitted in the concave portion 146 in each of the first parallel plane 134 and the first slant plane 138.

A concave portion 154 having a semicircular shape in section is formed in the holding member 150, and a roller 156 is inserted in the concave portion 154. The roller 156 is rotatively supported to the holding member 150 by means of a shaft member 158 (see FIG. 9). In this case, in place of the roller 156, a sliding member (not shown) which slidably abuts against the rail member 36 may be attached to the concave portion 154 of the holding member 150.

Among the second parallel plane 140, the third slant plane 144 and the fourth slant plane 142 in each of the guide rails 116a and 116b, in a plane facing a plane to which the roller 156 is attached (see the second parallel plane 140 and the third slant plane 144 in FIG. 9), groove portions 24a and 24b, each of which has an almost trapezoidal section, are formed in the longitudinal direction of the plane so as to be superposed upon the other, and a groove portion 26 having an almost T-shaped section is formed in the bottom of the groove portion 24b, similarly to one of the guide mechanism 10 of the first embodiment. A pair of hard supporting members 28a and 28b are respectively inserted in both ends of the groove portion 24b in the axis line direction of the guide rails 116a and 116b, and an elastic supporting member 32 is inserted between the hard supporting members 28a and 28b (see FIG. 5). The rail member 36 is inserted in the groove portion 24a, so that the rail member 36 is supported in its both ends by the hard supporting members 28a and 28b and in the vicinity of the center thereof by the elastic supporting member 32. The roller 156 is provided to be capable of rolling on the rail member 36. In this case, the rail member 36 may be provided in each of the second parallel plane 140, the third slant plane 144 and the fourth slant plane 142.

A groove portion 164 is formed in each of the guide blocks 118a and 118b in their displacement direction, and a magnet 166 for detecting the position is inserted in the groove portion 164 (see FIG. 9).

Figure 8:
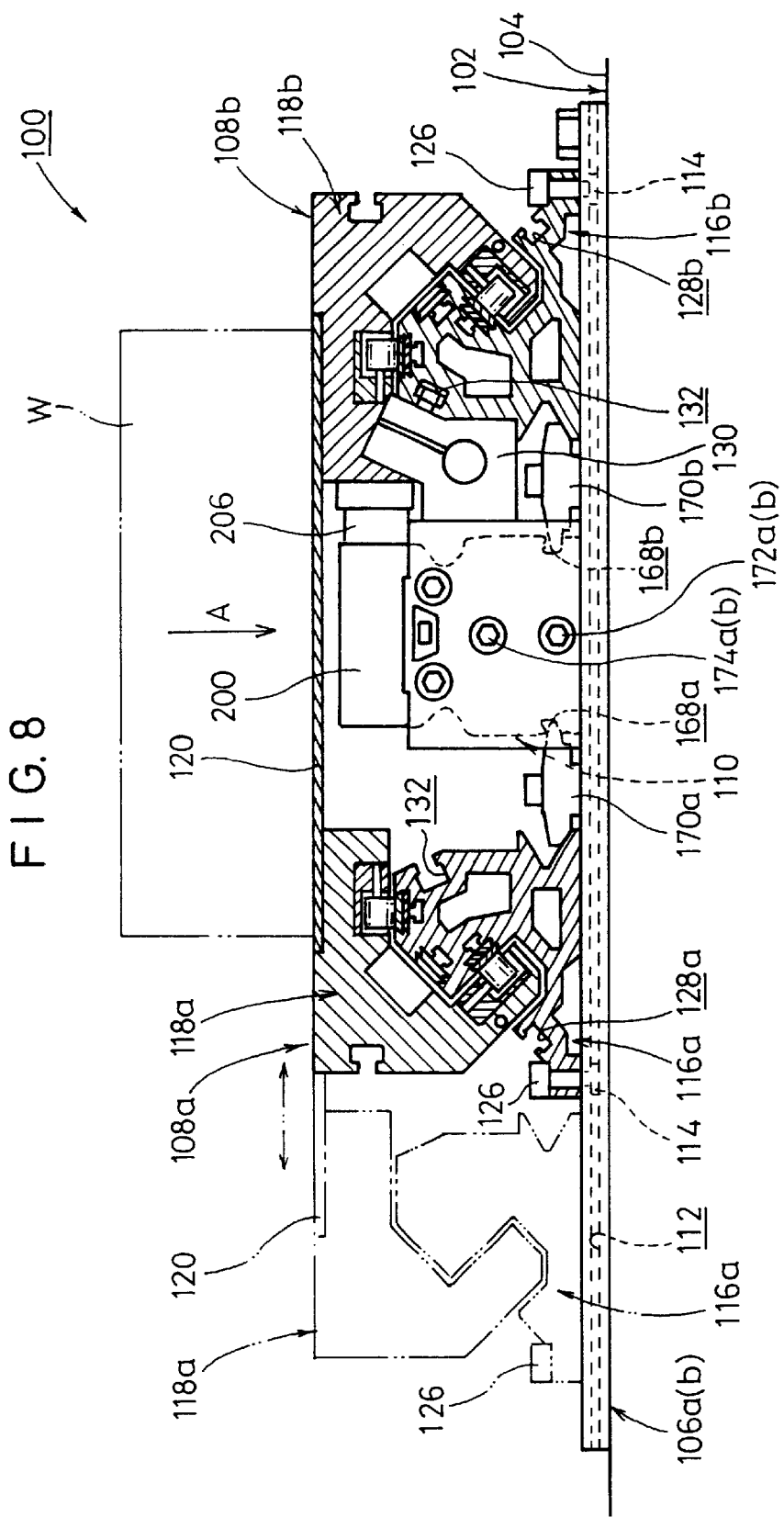
FIG. 8 is a partially sectional front view of the cylinder unit.

Groove portions 168a and 168b are formed on the side planes of a rodless cylinder 110 provided parallel to the guide rails 116a and 116b as well as between the fitting members 106a and 106b as shown in FIG. 8. Latching members 170a and 170b engage with the groove portions 168a and 168b, respectively, and the latching members 170a and 170b are screwed to the fitting members 106a and 106b, respectively. Thus, the rodless cylinder 110 is fixed to the fitting members 106a and 106b. As shown in FIG. 6, end blocks 172a and 172b are fixed to ends of the rodless cylinder 110, respectively, and pressurized fluid input/output ports 174a and 174b are formed in the end blocks 172a and 172b, respectively (see FIG. 6, FIG. 8 and FIG. 12). The pressurized fluid input/output ports 174a and 174b communicate with a fluid pressure supply source (not shown) through a magnetic valve and the like.

Figure 12:
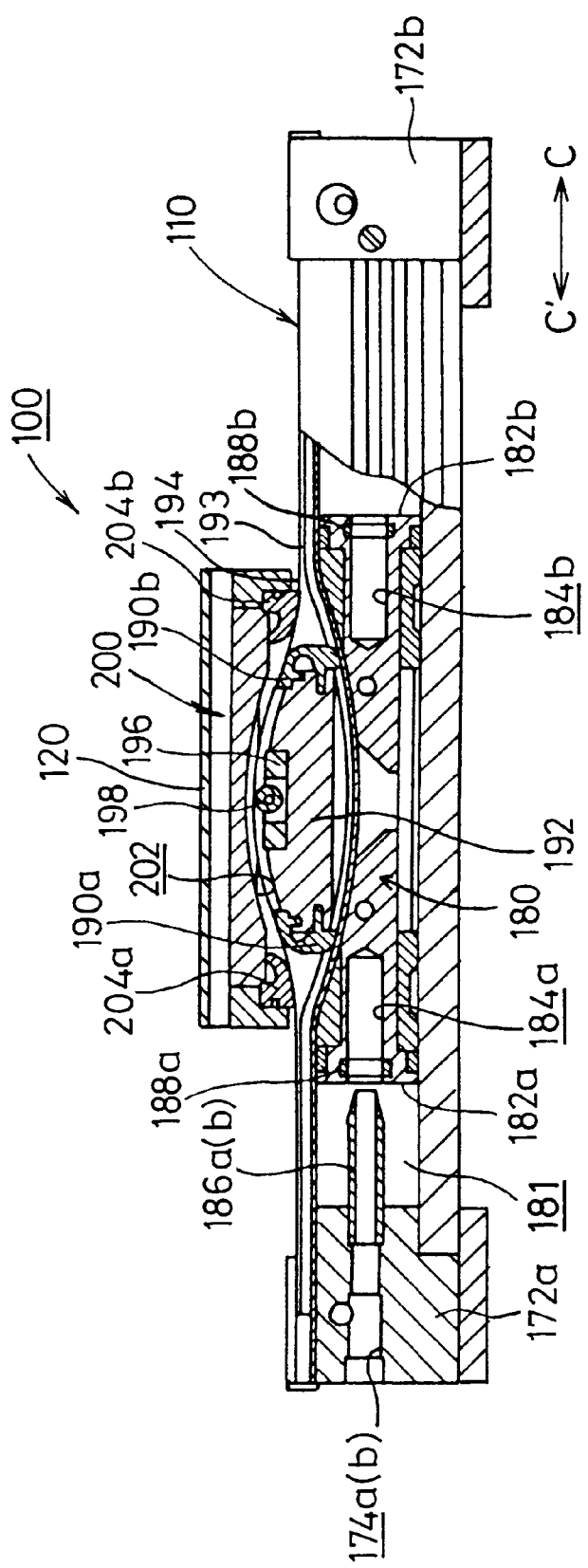
FIG. 12 is a vertically sectional view taken along an axis line direction of a cylinder tube constituting a rodless cylinder of the cylinder unit.

A piston 180 is inserted in the rodless cylinder 110 so as to be slidable along a cylinder chamber 181 as shown in FIG. 12. Pressure acceptance planes 182a and 182b are formed in both end portions of the piston 180, respectively, and hole portions 184a and 184b are formed in the pressure acceptance planes 182a and 182b along an axis line direction of the piston 180, respectively. Cylindrical members 186a and 186b, which are connected to the respective end blocks 172a and 172b and have through holes communicating with the respective pressurized fluid input/output ports 174a and 174b, are provided so as to be insertable in the hole portions 184a and 184b. Ring-shaped cushion seals 188a and 188b are provided on walls defining the hole portions 184a and 184b, respectively. Belt separators 190a and 190b are fixed to a piston yoke 192 above the piston 180. The belt separators 190a and 190b serve to allow a first seal member 193 and a second seal member 194 provided on the rodless cylinder 110 to separate from each other. A roller 198 is rotatively supported on the piston yoke 192, interposing a supporting member 196 therebetween.

Above the rodless cylinder 110, a displacement member 200 is provided for moving reciprocatively along its axis line direction, and a concave portion 202 having a curved section is formed in the bottom plane portion of the displacement member 200. A supporting member 196 is fitted into a wall (not shown) defining the concave portion 202, and thus the displacement member 200 makes a displacement integrally with the piston 180. The supporting member 196 functions as a floating mechanism for allowing the displacement of the displacement member 200. Scrapers 204a and 204b are provided in a lower portion of the displacement member 200. The displacement member 200 is connected to one guide block 118b by a joint 206 as shown in FIG. 8. It is not always necessary to provide such a floating mechanism for allowing the displacement of the displacement member 200 in the rodless cylinder 110.

The cylinder unit 100 in which the guide mechanisms 108a and 108b are used according to the second embodiment is constructed basically as described above, and its operation and effects will be described below.

First, the cylinder unit 100 is approximately horizontally fitted onto the base 102 as shown in FIGS. 8 and 9. When a load of workpiece W is applied to the table 120 of the cylinder unit 100 in the direction represented by the arrow A, the holding member 150 is inserted in the concave portions 146 of the first parallel plane 134 and the first slant plane 138 provided in each of the guide blocks 118a and 118b, and the holding member 150 is attached to the first parallel plane 134 and the first slant plane 138 by the screws 152, respectively. Therefore, the rollers 156 are attached to the first parallel plane 134 and the first slant plane 138, respectively. The hard supporting members 28a and 28b and the elastic supporting member 32 are attached to the second parallel plane 140 of each of the guide rails 116a and 116b and the groove portion 24b of the third slant plane 144, and the rail member 36 is attached to the groove portion 24a.

When pressurized fluid such as compressed air is supplied from a pressurized fluid supply source (not shown) to one pressurized fluid input/output port 174a of the cylinder unit 100 constructed as described above, the pressurized fluid presses the pressure acceptance plane 182a via a path in the cylindrical member 186a. Therefore, the piston 180 makes a displacement toward the direction represented by the arrow C in FIG. 12. At this time, since the supporting member 196 is fitted to a wall constituting the concave portion 202 of the displacement member 200, the piston 180 and the displacement member 200 make a displacement toward the direction represented by the arrow C.

This displacement action is transmitted to one guide block 118b via the joint 206, and transmitted to the table 120 and the other guide block 118a from the guide block 118b. Therefore, the guide blocks 118a and 118b and the table 120 make an integral displacement in the longitudinal direction of the rodless cylinder 110, and carry the workpiece W.

Similarly, when pressurized fluid is supplied to the other pressurized fluid input/output port 174b (see FIG. 8) provided on the opposite side to one pressurized fluid input/output port 174a, the piston 180 makes a displacement toward the direction represented by the arrow C' in FIG. 12, and the workpiece W is carried to the direction represented by the arrow C'.

At this time, a load of the workpiece W is applied to the table 120 in the direction represented by the arrow A. This load is supported by the roller 156 attached to the first parallel plane 134 of each of the guide blocks 118a and 118b and the rail member 36 provided in the second parallel plane 140 of each of the guide rails 116a and 116b. Force due to an offset load of the workpiece W is sometimes applied to the guide blocks 118a and 118b in the direction approximately perpendicular to that represented by the arrow A or the slanted direction thereto. This force is supported by the roller 156 attached to the first slant plane 138 of each of the guide blocks 118a and 118b and the rail member 36 attached to the third slant plane 144 of each of the guide rails 116a and 116b.

If the position precision of the peripheries of the centers of the guide rails 116a and 116b deteriorates owing to a warp, a distortion, a bend and the like of the guide rails 116a and 116b and a tensile action, a compression action and the like occur between the guide blocks 118a and 118b and the guide rails 116a and 116b, the wear of the rail member 36 increases and the overload is applied to the roller 156. If the load applied to the roller 156 is further applied to the rail member 36, the rail member 36 is slightly bent by elasticity of the elastic supporting member 32. Accordingly, since the overload applied to the roller 156, the rail member 36 and the like is absorbed properly by an elastic action of the foregoing elastic supporting member 32, the wear of the rail member 36 is reduced, and the load applied to the roller 156 is relieved.

Here, adjusting the width of the table 120 corresponding to the shape of the workpiece W, the size and the like thereof will be explained below.

The table 120 is detached from the guide blocks 118a and 118b, and the screws 126 for fitting one guide rail 116a to the fitting members 106a and 106b are loosened. One guide rail 116a is allowed to move along the fitting members 106a and 106b as represented by the chain double-dashed lines in FIG. 8. At this time, the nut member 114 moves inside the groove portion 112 together with the guide rail 116a. After the guide rail 116a is moved to a desired position, the screws 126 are securely fastened again, and the guide rail 116a is fixed to the fitting members 106a and 106b. Then, the table 120 having the width corresponding to the distance between the guide blocks 118a and 118b at this time is fitted to the guide blocks 118a and 118b.

When the cylinder unit 100 fitting thereto the table 120 with a large width is used as described above, a moment of the workpiece W in the direction approximately perpendicular to the direction of movement of the guide blocks 118a and 118b can be supported suitably by the table 120, and the workpiece W can be carried stably. In addition, since it is unnecessary to change the guide rails 116a and 116b and the guide blocks 118a and 118b to big ones, a cost can be reduced, and since a dimension is not changed in the height direction from the fitting plane 104 to the table 120, a degree of freedom in design increases.

Figure 13:
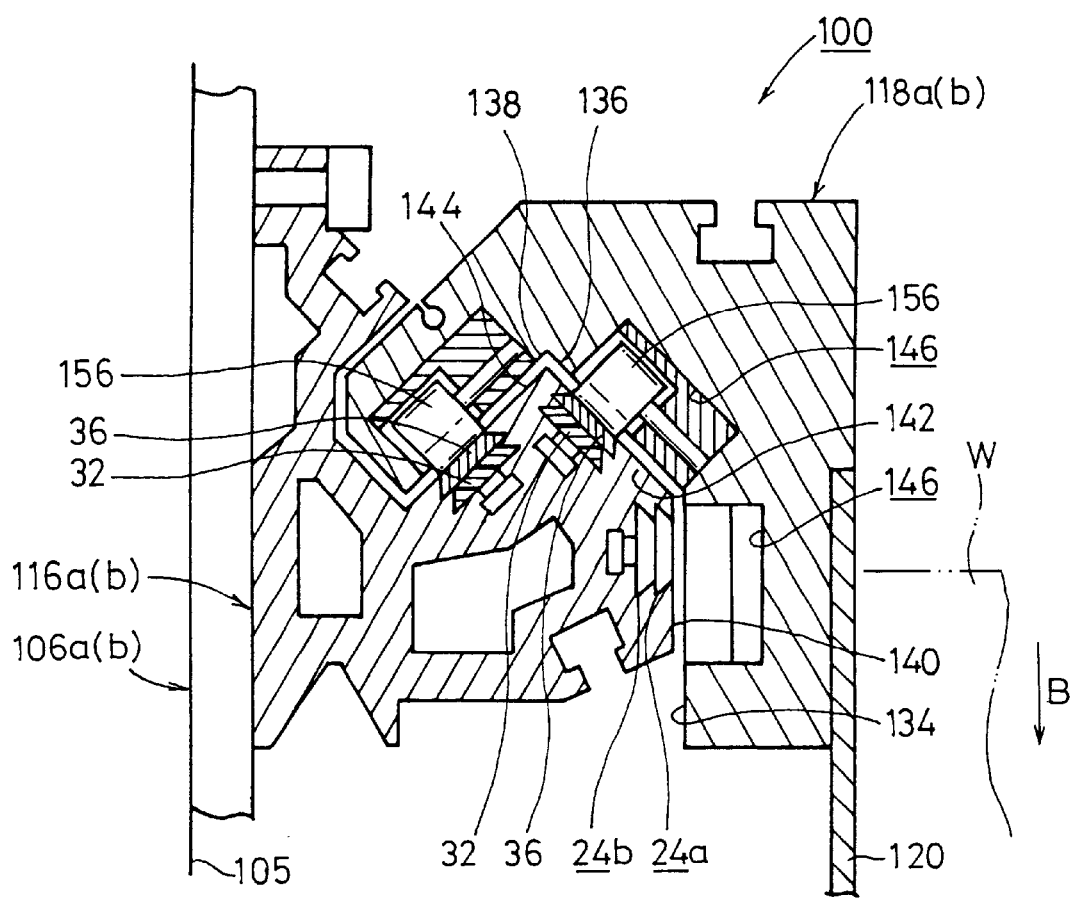
FIG. 13 is a partially enlarged sectional view under conditions that a mounting posture of the cylinder unit is changed and a work load is applied thereto in the almost vertical direction.

When by changing the mounting posture of the cylinder unit 100 and by fitting the cylinder unit 100 to a wall plane 105 approximately perpendicular thereto as shown in FIG. 13, a load is applied to the side planes of the guide blocks 118a and 118b in the direction represented by the arrow B, the holding member 150 is inserted in the concave portion 146 of each of the first and second slant planes 138 and 136 of the guide blocks 118a and 118b, and the roller 156 is attached to each of the first and second slant planes 138 and 136. Moreover, the hard supporting members 28a and 28b and the elastic supporting member 32 are attached to the groove portions 24b of the third and fourth slant planes 144 and 142 of the guide rails 116a and 116b, and the rail member 36 is attached to the groove portion 24b (see FIG. 5).

When a load of the workpiece W is applied to the guide blocks 118a and 118b in the direction represented by the arrow B, this load is supported by the rollers 156 attached to the first and second slant planes 138 and 136 of the guide blocks 118a and 118b and the rail members 36 provided in the third and fourth slant planes 144 and 142 of the guide rails 116a and 116b.

As described above, even if the direction in which the load of the workpiece W is applied is changed, presumable disadvantages can be avoided only by changing the attachment positions of the rollers 156, the hard supporting members 28a and 28b, the elastic supporting member 32 and the rail member 36 are changed. Moreover, when the rollers 156 are attached to all of the first parallel plane 134 and the first and second slant planes 138 and 136 of each of the guide blocks 118a and 118b, and the hard supporting members 28a and 28b, the elastic supporting member 32 and the rail member 36 are attached to all of the second parallel plane 140 and the third and fourth slant planes 144 and 142 of each of the guide rails 116a and 116b, the load of the workpiece W can be supported suitably regardless of the direction of the load of the workpiece W and the mounting posture of the cylinder unit 100.

In the second embodiment applied to the cylinder unit 100, though the pair of the guide mechanisms 108a and 108b are arranged approximately in parallel with each other interposing the rodless cylinder 110, the structure is not limited thereto. The guide mechanism 108a (108b) approximately parallel with the rodless cylinder 110 may be singularly used, or two guide mechanisms 108 or more may be juxtaposed.

The cylinder unit 100 to which the guide mechanism is applied is not limited to the rodless cylinder 110, but the single or plural guide mechanisms may be annexed to a fluid pressure cylinder (not shown) or a linear actuator (not shown) such as an electrically operated actuator.

Industrial Applicability

According to the present invention, when the guide block is located at a predetermined position of the guide rail, the roller of the guide block is located at a position where it is supported by the hard supporting member of the rail member. Accordingly, the guide block never makes a displacement in a direction approximately perpendicular to a displacement direction thereof, and the guide block is positioned at a predetermined position precisely. On the other hand, when the guide block is located at other positions than the foregoing predetermined position of the guide rail, the rail member makes a displacement in a direction approximately perpendicular to a displacement direction of the guide block due to elasticity of an elastic supporting member in spite of lowering of a position precision of the guide rail owing to a warp, a distortion, a bend and the like. Then, wear of the rail member and a load applied to the roller are relieved and a smooth guide function can be exerted.

Furthermore, since the first and second tapered portions engage with each other in a joint of the hard supporting member and the elastic supporting member, when the roller rolls between a position where it is supported by the hard supporting member of the rail member and a position where it is supported by the elastic supporting member thereof, the rail member bends gradually along the second tapered portion of the elastic supporting member, so that occurence of vibrations due to a step difference can be suppressed.

What is claimed is:

1. A guide mechanism comprising:

a guide rail (18, 116a, 116b) formed to be elongate;

a guide block (20, 118a, 118b) for making a displacement along an axis line direction of said guide rail (18, 116a, 116b);

a rail member (36) provided on a sliding plane along the axis line direction of said guide rail (18, 116a, 116b), the rail member (36) allowing said guide block (20, 118a, 118b) to slide thereon;

hard supporting members (28a, 28b) provided in a groove portion (24b) of said guide rail (18, 116a, 116b), the hard supporting members (28a, 28b) supporting said guide block (20, 118a, 118b) at a predetermined position of said rail member (36); and an elastic supporting member (32) having elasticity, the elastic supporting member (32) being provided in said groove portion (24b) and supporting said guide block (20, 118a, 118b) at an other position than said predetermined position of said rail member (36).

2. The guide mechanism according to claim 1, wherein said hard supporting members (28a, 28b) are each attached to the groove portion (24b) along the axis line direction of the guide rails (18, 116a, 116b) at both ends thereof; said elastic supporting member (32) is attached between a pair of said hard supporting members (28a, 28b) coaxially; said hard supporting members (28a, 28b) support said guide blocks (20, 118a, 118b) at both ends of the rail member (36); and said elastic supporting member (32) supports said guide blocks (20, 118a, 118b) at a position in a vicinity of a center of said rail member (36).

3. The guide mechanism according to claim 1, wherein said hard supporting member has a first tapered portion (30) made to be gradually thinner toward said elastic supporting member; and said elastic supporting member has a second tapered portion (34) made to be gradually thinner toward said hard supporting member, the second tapered portion (34) engaging with said first tapered portion (30).

4. The guide mechanism according to claim 1, wherein a plurality of rollers (50) are provided in said guide block (20) for rollably abutting against the said rail member (36).

5. The guide mechanism according to claim 1, wherein a sliding member is provided in said guide block (20) for slidably abutting against said rail member (36).

6. The guide mechanism according to claim 1, wherein said guide mechanism (10) is provided singularly.

7. The guide mechanism according to claim 1, wherein a plurality of said guide mechanisms (10) are arranged approximately in parallel with each other.

* * * * *